(12) United States Patent
Lee et al.

(10) Patent No.: US 10,628,785 B2
(45) Date of Patent: Apr. 21, 2020

(54) MOBILIZED LAUNDRY SERVICE SYSTEM

(71) Applicants: Chang Shin Lee, Westminster, CO (US); Sung Lee, Westminster, CO (US)

(72) Inventors: Chang Shin Lee, Westminster, CO (US); Sung Lee, Westminster, CO (US)

( * ) Notice: Subject to any disclaimer, the term of this patent is extended or adjusted under 35 U.S.C. 154(b) by 913 days.

(21) Appl. No.: 15/047,168

(22) Filed: Feb. 18, 2016

(65) Prior Publication Data

US 2017/0098191 A1    Apr. 6, 2017

Related U.S. Application Data

(63) Continuation-in-part of application No. 13/573,068, filed on Aug. 18, 2012, now abandoned.

(51) Int. Cl.
| | |
|---|---|
| *G06Q 10/08* | (2012.01) |
| *G06Q 10/10* | (2012.01) |
| *B60P 9/00* | (2006.01) |
| *G06Q 10/04* | (2012.01) |
| *G06Q 10/06* | (2012.01) |

(52) U.S. Cl.
CPC .......... *G06Q 10/08355* (2013.01); *B60P 9/00* (2013.01); *G06Q 10/04* (2013.01); *G06Q 10/047* (2013.01); *G06Q 10/06311* (2013.01); *G06Q 10/1097* (2013.01)

(58) Field of Classification Search
CPC . G06Q 10/08355; G06Q 10/08; G06Q 10/083
See application file for complete search history.

(56) References Cited

U.S. PATENT DOCUMENTS

| | | | | | |
|---|---|---|---|---|---|
| 3,072,072 | A | * | 1/1963 | McDonough | A22B 7/004 104/110 |
| 4,297,071 | A | * | 10/1981 | Dunbar | B60P 1/5442 212/74 |
| 5,664,659 | A | * | 9/1997 | Gaertner | B65G 47/61 198/360 |
| 6,974,077 | B1 | * | 12/2005 | Beyder | G06Q 10/08 235/381 |
| 2002/0004703 | A1 | * | 1/2002 | Gaspard, II | G01C 21/343 701/410 |

\* cited by examiner

*Primary Examiner* — George Chen
(74) *Attorney, Agent, or Firm* — Craig W. Barber; Barber Legal

(57) ABSTRACT

A distributed laundry system having mobilized laundry vehicles, including true laundry conveyors in the vehicles, and including a specialized distributed computer network in the vehicles to handle the circumstances of mobile laundry operations, such as special laundry instructions. In addition, procedures and operations which allow the vehicles to cooperate to provide efficient pickup and drop off services at locations of the customers' choices (such as at home or work), including flexible territories for the trucks, customer user interfaces on mobile devices such as cell phones, mobile computing devices and the like, and precise time estimates of pick-up and drop-off times.

9 Claims, 12 Drawing Sheets

MOBILIZED LAUNDRY SERVICE SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

CROSS-REFERENCE TO RELATED APPLICATIONS

N/A

FIELD OF THE INVENTION

This invention relates generally to laundry service devices and systems, and specifically to an improved laundry system distributed across a number of vehicles, computers and mobile devices.

STATEMENT REGARDING FEDERALLY FUNDED RESEARCH

This invention was not made under contract with an agency of the US Government, nor by any agency of the US Government.

BACKGROUND OF THE INVENTION

Laundry service generally is provided by means of a single system: one or more fixed drop off and pickup locations (dry cleaners or stores) which in turn have or supply a laundry cleaning facility. In operation, dirty laundry which is dropped off by customers coming to the dry cleaning stores is sent to the laundry cleaning facility, returned, and then the customers return to the stores to pick up their cleaned laundry.

Only a few variations exist. One common variation is hotel laundry service, in which the customer checks into a hotel and while there, can simply have the hotel take care of getting the laundry cleaned. In practice, the hotel actually usually sends the laundry out to a traditional laundry system anyway, though the laundry system may go as far as providing pickup from the hotel.

U.S. Pat. No. 6,974,077, issued Dec. 13, 2005 in the name of Beyder et al teaches a laundry and mobile business related invention. In the '077 patent, a truck is parked at a location other than a laundry store, thus allowing customers to visit the truck and drop off or pick up their laundry according to a regular schedule. Thus the truck functions as a "part time" laundry pick up and drop off facility which is able to move to several different locations. The truck is provided with a laundry scale and an invoice generator (printer).

The '077 patent teaches away from the present invention. First of all, there is teaching in the '077 patent that the truck should park in single location and customers should come to the truck. In the present invention, the contrary is true: the truck will come to the customers. Secondly the truck of the '077 patent operates on a regular and fixed schedule, for example fixed laundry return times when customers can find the truck parked in its regular location. Chaos and unhappy customers would result if the truck were absent from these fixed locations at times customers believed they could pick up their laundry. In the present invention, the contrary is true: the truck moves about flexibly in response to specific customer requests and customers do not attempt to go find the truck. For these reasons, the '077 patent teaches away from the present invention and cannot be combined with other references in any attempt to use the present disclosure as a template.

In addition to teaching away from the present invention, the '077 patent furthermore lacks any reference to a network of similar vehicles, lacks any reference to mobile networking devices, lacks any reference to specialized mobile laundry modules, lacks any reference to providing pickup and drop off services at locations and times of customer choice, lacks any reference to a mobile app for customer requests, lacks any reference to an online presence for customer requests, lacks flexible territories, and lacks any reference to specialized laundry conveyors or bridges to fixed installations.

The '077 reference may have a cargo compartment but clearly lacks any hanging laundry compartment within the cargo compartment, apertures, etc.

U.S. Pat. No. 4,494,896 to DiFranco teaches a garment truck. The garment truck of the '896 reference may have a cargo compartment but definitely and explicitly teaches AWAY from hanging laundry compartments hanging inside of the cargo compartment: the reference instead teaches bars across the cargo compartment.

US Patent application 20020004703 to Gaspard II teaches a hybrid passenger and freight transport vehicle similar to a long distance bus and a flatbed truck. It does not teach toward the transformation of a product (laundry) as the present invention teaches. It also, as all the prior art, does not teach a hanging laundry compartment.

U.S. Pat. No. 3,072,082 to McDonough teaches a meat truck. As is knowns in meat trucks, large meat hooks (a specific type of large strong hook having a very sharp point and lacking any aperture) are used to hang animal carcasses. It does not teach any laundry related structures or steps.

U.S. Pat. No. 4,297,071 to Dunbar teaches a truck for hauling extremely heavy vehicle scale test weights. These weights are so heavy that they dominate the structure of the vehicle and it's movable crane. These structures for the handling of very durable half ton weights teach nothing toward or relevant to laundry service.

It is worth noting that conveyors for laundry can be used to make hanging and handling of laundry much simpler than handling it piece by piece, or just hanging it from a simple bar. There are a few laundry delivery vehicles which have bars, however, these bars are simple cylindrical bars which are supported at the ends by the walls of the truck they are mounted in, that is, the bars are similar to the bars in a typical home closet. Thus known trucks have bars across from side to side or even from front to back, which bars are supported by walls, not the ceiling. Such bars lack means of restraining the laundry from sliding along the bar during truck motions. Such bars also lack means of moving/handling the laundry automatically.

Nothing in the prior art teaches that laundry service may be provided at the customer's location, with a specified pickup and drop-off appointment time, for the transformation of the physical laundry (from dirty to clean, from unpressed to pressed, torn to fixed, alterations made, etc.). Nothing in the prior art teaches that laundry trucks may have special hanging compartments within their cargo compartments and so on and so forth.

It would be preferable to provide a distributed laundry system having mobilized store equivalents, including real laundry conveyors in the trucks, a specialized distributed computer network in the trucks to handle the circumstances of mobile laundry operations, procedures and operations which allow the trucks to cooperate to provide pickup and drop off services at locations of the customers' choices (such as at home or work), including flexible territories for the trucks, customer user interfaces on mobile devices such as cell phones, mobile computing devices and the like, and so on.

SUMMARY OF THE INVENTION

General Summary

The present invention provides specialized laundry vehicles which not only are set up with the specialized equipment needed for laundry operations but in addition, go beyond that to provide efficient routing of vehicles to customer pick up locations. The term "laundry" as used herein includes all the normal functions of laundry service, including laundry, dry cleaning, alterations, laundry as part of institutional housekeeping (hotels, resorts, organizations, etc), care for leather goods and so on.

The specialized equipment on the laundry vehicles ("trucks, vans, etc") includes hanging conveyors specifically designed for laundry/alterations/specialty service/dry cleaning handling. It further includes location sensors in the trucks which cooperate with a precise time estimation module to calculate and provide an exact time estimate to a customer for when a laundry vehicle will arrive to pick up or drop-off their laundry. It further includes specialized modules or functionality which receives laundry-specific instructions ("dry-cleaning, laundry, housekeeping, alteration, leather, etc") and associates those instructions with a specific customer address.

The system of the invention further allows for virtual and flexible territories of a network of vehicles, so that vehicles can cooperate to provide maximum efficiency and speed of pick up operations at customers own locations, which may be their homes, offices, hotels not offering laundry services, or any other location which a customer might find convenient for laundry exchange.

The in-truck hanging conveyor of the system allows automatic handling of laundry, in particular, laundry may be moved along the conveyor so that the laundry needed at any given stop is always closest to the doorway at that time, thus preventing the operator from sorting through static rows of laundry hunting for the correct items. Furthermore, the in-truck conveyor of the invention has numerous hanger apertures (holes, notches, etc) which keep individual hangers in place even when the mobilized laundry service vehicle accelerates, brakes, turns corners and so on. This maintains laundry in a pristine and beautiful condition despite being driven to the customer while hanging. In addition to that, the in-truck hanging conveyor of the invention furthermore allows for actual laundry compartments which hang from the conveyor system, and inside of which the laundry hangs, providing even greater protection of the laundry during transport.

These and other examples of aspects, advantages, objectives and embodiments of the invention will be clarified in the disclosure provided.

SUMMARY IN REFERENCE TO CLAIMS

It is therefore another aspect, advantage, objective and embodiment of the invention to provide an electronic laundry vehicle network comprising:

a plurality of laundry vehicles, each of said laundry vehicles having an assigned a virtual mobile territory;

each of said laundry vehicles having a location tracking device, a central processing device and a non-volatile digital memory device;

each of said non-volatile digital memory devices having a plurality of modules for use by said central processing devices;

a customer access service operative to receive a specific first customer location, said modules including;

an in-vehicle network interface module operative to maintain data exchange between each of said laundry vehicles and said network;

an in-vehicle address and laundry instruction module operative to receive said specific first customer location;

a precise time estimate module operative to immediately provide a precise time for one of said laundry vehicles to reach said specific first customer location;

a pickup/scheduling/routing module operative to efficiently route one of said laundry vehicles among a plurality of customer locations;

an in-vehicle master laundry module operative to control functionality of said modules;

said in-vehicle address and laundry instructions module further operative to receive specific laundry instructions and associate them with said specific first customer location;

said network further operative to modify said virtual mobile territories;

said pickup/scheduling/routing module further operative to monitor locations of each of said laundry vehicles and efficiently route one of said laundry vehicles to said specific first customer location even if said specific first customer location is not in said virtual mobile territory assigned to said laundry vehicle.

It is therefore another aspect, advantage, objective and embodiment of the invention to provide an electronic laundry vehicle network further comprising:

a hanging conveyor having thereon a plurality of laundry hanger apertures;

a conveyor control module operant to automatically control said hanging conveyor.

It is therefore another aspect, advantage, objective and embodiment of the invention to provide an electronic laundry vehicle network wherein:

said customer access service further comprises a mobile app and an in-vehicle interface to mobile app module operant to receive said specific first customer location.

It is therefore another aspect, advantage, objective and embodiment of the invention to provide an electronic laundry vehicle network wherein:

said non-volatile digital memory device further comprises:

a cost/receipt module operative to communicate with a printing device and print out special instructions indicators suitable for garment attachment.

It is therefore yet another aspect, advantage, objective and embodiment of the invention to provide a mobilized laundry service vehicle comprising:

a cargo vehicle;

said cargo vehicle equipped with a hanging conveyor having a movable rail, said rail having at least one individual hanger aperture dimensioned and configured to receive at least one laundry hanger;

said cargo vehicle further having a location tracking device, a central processing device and a non-volatile digital memory device;

said cargo vehicle further having a conveyor control module operant to automatically control said hanging conveyor;

said cargo vehicle further having an in-vehicle network interface module operative to maintain data exchange between said laundry vehicles and a computer network;

said cargo vehicle further having an in-vehicle address and laundry instruction module operative to receive a specific first customer location;

said cargo vehicle further having a precise time estimate module operative to immediately provide a precise time for said laundry vehicle to reach said specific first customer location;

said cargo vehicle further having a pickup/scheduling/routing module operative to efficiently route said laundry vehicle among a plurality of customer locations and further operative to monitor locations of each of said laundry vehicles and efficiently route one of said laundry vehicles to said specific first customer location even if said specific first customer location is not in said virtual mobile territory assigned to said laundry vehicle;

said cargo vehicle further having an in-vehicle master laundry module operative to control functionality of said modules;

said in-vehicle address and laundry instructions module further operative to receive specific laundry instructions and associate them with said specific first customer location.

It is therefore another aspect, advantage, objective and embodiment of the invention to provide a mobilized laundry service vehicle further comprising:

at least one hanger carrier upon such rail, said hanger carrier having said individual hanger aperture thereon.

It is therefore another aspect, advantage, objective and embodiment of the invention to provide a mobilized laundry service vehicle wherein the hanger aperture comprises: a hanger slot defined by two hanger blocks.

It is therefore another aspect, advantage, objective and embodiment of the invention to provide a mobilized laundry service vehicle, wherein the hanger carrier comprises:

a hanging compartment depending from the hanger carrier, the hanging compartment having therewithin a bar dimensioned and configured to hold laundry hangers, the hanging compartment dimensioned and configured to accept such laundry therewithin;

whereby such laundry hangs protected within the compartment.

It is therefore another aspect, advantage, objective and embodiment of the invention to provide a mobilized laundry service vehicle wherein:

said hanging conveyor depends from the ceiling of said cargo vehicle.

It is therefore another aspect, advantage, objective and embodiment of the invention to provide a mobilized laundry service vehicle wherein said non-volatile digital memory device further comprises:

a cost/receipt module operative to communicate with a printing device and print out special instructions indicators suitable for garment attachment.

It is therefore another aspect, advantage, objective and embodiment of the invention to provide a method of providing laundry service comprising the steps of:

providing a customer access service operative to receive a specific first customer location;

calculating and providing a precise time until pickup of such laundry at said specific first customer location;

driving a mobilized laundry system vehicle to said specific first customer location, such mobilized laundry system vehicle having a location tracking device and a hanging conveyor and a module operant to automatically control said hanging conveyor;

picking up such laundry at said specific first customer location;

receiving specific laundry instructions and associating such specific laundry instructions with such specific first customer location;

handling such laundry by means of said automatically controlled hanging conveyor;

receiving payment and providing a receipt for such laundry;

scheduling a drop-off of such laundry;

laundering at a laundry facility such laundry according to such specific laundry instructions associated with such specific first customer location; and returning to said specific first customer location such laundry.

It is therefore another aspect, advantage, objective and embodiment of the invention to provide a method of providing laundry service, wherein:

said mobilized laundry system vehicle further comprises a cargo vehicle;

said hanging conveyor having a movable rail, said rail having at least one individual hanger aperture dimensioned and configured to receive at least one laundry hanger;

said cargo vehicle further having a central processing device and a non-volatile digital memory device;

said cargo vehicle further having an in-vehicle network interface module operative to maintain data exchange between said laundry vehicles and a computer network;

said cargo vehicle further having an in-vehicle address and laundry instruction module operative to receive a specific first customer location;

said cargo vehicle further having a precise time estimate module operative to immediately provide a precise time for said laundry vehicle to reach said specific first customer location;

said cargo vehicle further having a pickup/scheduling/routing module operative to efficiently route said laundry vehicle among a plurality of customer locations and further operative to monitor locations of each of said laundry vehicles and efficiently route one of said laundry vehicles to said specific first customer location even if said specific first customer location is not in said virtual mobile territory assigned to said laundry vehicle;

said cargo vehicle further having an in-vehicle master laundry module operative to control functionality of said modules;

said in-vehicle address and laundry instructions module further operative to receive specific laundry instructions and associate them with said specific first customer location.

It is therefore another aspect, advantage, objective and embodiment of the invention to provide a method of providing laundry service, wherein:

said customer access service further comprises a mobile app and an in-vehicle interface to mobile app module operant to receive said specific first customer location.

INDEX TO REFERENCE NUMERALS

Figure 1A:
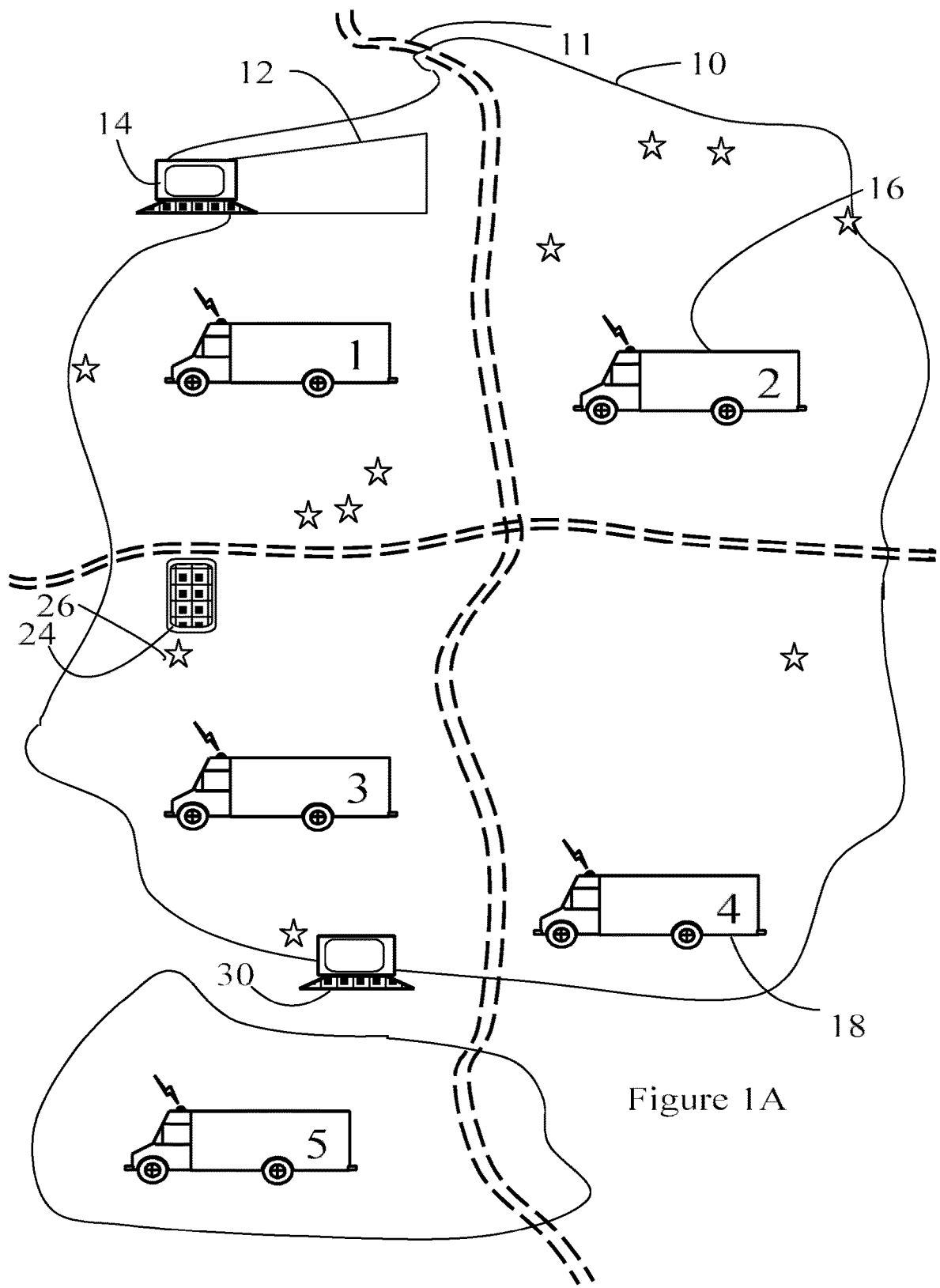
FIG. 1A is an overview of the mobilized laundry service system of the invention.

A First customer laundry pickup
B Second customer laundry pickup
110 Metropolitan area
112 Laundering facility
114 Laundering facility computer
116 First truck (first mobilized laundry service unit)
118 Fourth truck
120 Fourth truck to A
122 Fourth truck from A to B
124 Mobile device
126 Mobile laundry app on mobile device
128 Boundary zone
130 Customer computer
202 Truck; Mobilized laundry service unit
204 Truck computer
206 Truck tracking device
208 Conveyor
210 Ceiling support for conveyor
212 Laundry
214 Doorway/access to laundry
216 Link to other units of network
218 Laundry bin
302 Server
304 Office/management computer (may be in truck)
306 Internet
308 App for mobile device
310 Website
312 Customer computer
314 Communication system (cell tower)
316 Truck computer
318 Truck tracking device
402 Master module these modules may be functionalities, aspects, programs, etc
404 Precision time estimation module
406 Pickup scheduling & routing module
408 Drop off scheduling & routing module
410 Location tracking module
412 Laundry special instructions & address module
414 Interface to website module
416 Interface to other network computers module
418 Interface to mobile app module
420 Costs/receipt module
422 Conveyor control module
424 Management module
502 Customer seeks laundry service
504 Customer accesses mobile app
506 Customer calls on telephone
508 Customer accesses website
510 Customer provides address
512 Scheduling/routing and Precision time estimation modules provide precise time estimate, in minutes, until truck arrives to make pickup
514 Truck drives to address due to routing addition by Scheduling/routing module
516 Pickup of laundry
518 Automatic stowing of laundry using truck conveyor
520 Payment/receipt
522 Drop off scheduling
524 Truck does more stops as necessary to complete route and returns to laundering facility
526 Unload at facility using conveyor
528 Laundering using special instructions from Laundry special instructions & address module
530 Selection of day of loading laundry onto truck and selection of truck by scheduling/routing module
532 Loading onto truck using conveyor
534 Truck drives to address
536 Drop-off with auto handling by conveyor
602 Pickup and handling of laundry per FIGS. 5A, 5B
604 Laundering
606 Customer travels for pickup of laundry
608 Customer travels for drop off of laundry
610 Laundering
612 Drop off and handling of laundry per FIGS. 5A, 5B
702 Ceiling
704 Support
706 Rail
708 Hanger truck
710 Individual hanger aperture
712 Hanger aperture block
802 Wall
804 Wall mount
806 Rail
808 Hanger aperture
810 Hanger aperture block
902 Rail
904 Hanger slot block (bump)
906 Hanger slot
1002 Rail
1004 Support
1006 Hanger compartment
1008 Hook
1010 Garment
1012 Space for access
1014 Special laundry instruction indicator
1102 Ceiling
1104 Support
1106 Rail
1108 Hanger compartment
1110 Hanger bar

GLOSSARY OF DETAILED DESCRIPTION

The term "cargo compartment" as used herein, and the term "hanging laundry compartment", or "hanger compartment" or like terms, refer to different structures. A cargo compartment is a large part of a vehicle having space therein for equipment, cargo, personnel and so on. However, the "hanging laundry compartment" or a "hanger compartment" of the invention (for example 1108) is a small "clothing shaped" compartment which itself hangs down. Since the cargo compartment is part of the vehicle, when the vehicle sways in motion the cargo compartment sways with the vehicle. However, the "hanger compartment" of the invention is free to hang by itself and thus moves under the influence of gravity and centripetal force, in synch with the laundry inside the "hanging laundry compartment". The laundry is thus protected from contact with other laundry (for example laundry belonging to other customers), from contact with the sides of the cargo compartment, and so on.

Note that the hanging laundry compartment actually hangs within the cargo compartment.

The term "depending" refers to and may be replaced by the word "hanging".

An "aperture" as used herein does not refer to a space which does not have complete 360 degree encirclement in one plane of reference. Thus the apertures of the invention are holes passing through something (such as through a rail). The vaguely defined open area of a hook, which is not 360 degrees encircled, is not an aperture.

DETAILED DESCRIPTION

FIG. 1A is an overview of the mobilized laundry service system of the invention. (It will be understood that the term laundry as used herein refers to laundry/alterations/specialty service/institutional laundry/dry cleaning/leather cleaning and so on.) In the presently preferred embodiment and best mode presently contemplated for carrying out the invention, showing 10, a metropolitan area, which is (purely as an example) crossed by two highways (11) and thus neatly divided into four zones. In one embodiment example of the invention, these highways might be used to create fixed, un-changeable boundaries for vehicle territories.

Thus truck 1 may have the territory immediately surrounding the laundry facility and north of one highway and west of the other highway. Truck 5 may be assigned to cover an entire suburb, as shown in FIG. 1A.

Customer pickup locations are shown by stars.

Laundering facility 12 is a standard laundering facility such as might take in dirty laundry from one or more fixed laundry stores. In this case, the laundering facility 12 serves the trucks of the mobilized laundry service system of the invention. Laundering facility computer 14 can be considered to be the "master" management computer of the entire network: it is in communication with the in-truck computers and can do many of the same functions.

Second truck 16 ("truck 2") is in the virtual mobile territory around it, picking up laundry from customers at locations indicated by stars. Note that truck 16 does NOT have a regular route: the stars represent customers who have contacted the network at this particular time, not necessarily fixed locations which the truck serves every day. Fourth truck 18 is presently in a fixed territory to the south of first truck 16.

The customer access service of the invention is a crucial part of the invention as well. It will be noted that customers can find a local laundry store because it is in a fixed location. The present invention offers the customer the convenience of having the mobilized laundry store come to them, but that requires that it be easy for the customer to access the network laundry service.

A mobile device 24 is seen to be one possible way for this contact to be made. Mobile device 24 may be any device having a communication connection, such a smartphone (such as for example (and only as an example) an Apple® corporation iPhone® brand smartphone or a Samsung® corporation Galaxy® device), a tablet computer (for example, and only for example: such as a Samsung® corporation brand Galaxy Tab® device, an Apple® corporation brand iPad® device), a music player with wi-fi, Bluetooth, 3G, 4G or related capabilities, and so on and similar devices. Thus one important component of the invention is the Mobile App 26 of the invention, usually depicted as a small square on the touch screen of mobile device 24. Such a mobile app will allow customers to easily access the service and place orders from their smartphone even when they are not in a fixed location, that is, when they are in their car, or out doing errands, or socializing or so on.

Customer computer 30 may also access a website embodiment of the customer access service of the invention.

Finally customers may simply telephone the customer access service. Regardless of the method of contact used, the mobilized laundry service system is next able to provide customers with an exact (to within a matter of a few minutes) time at which pickup will be made.

Figure 1B:
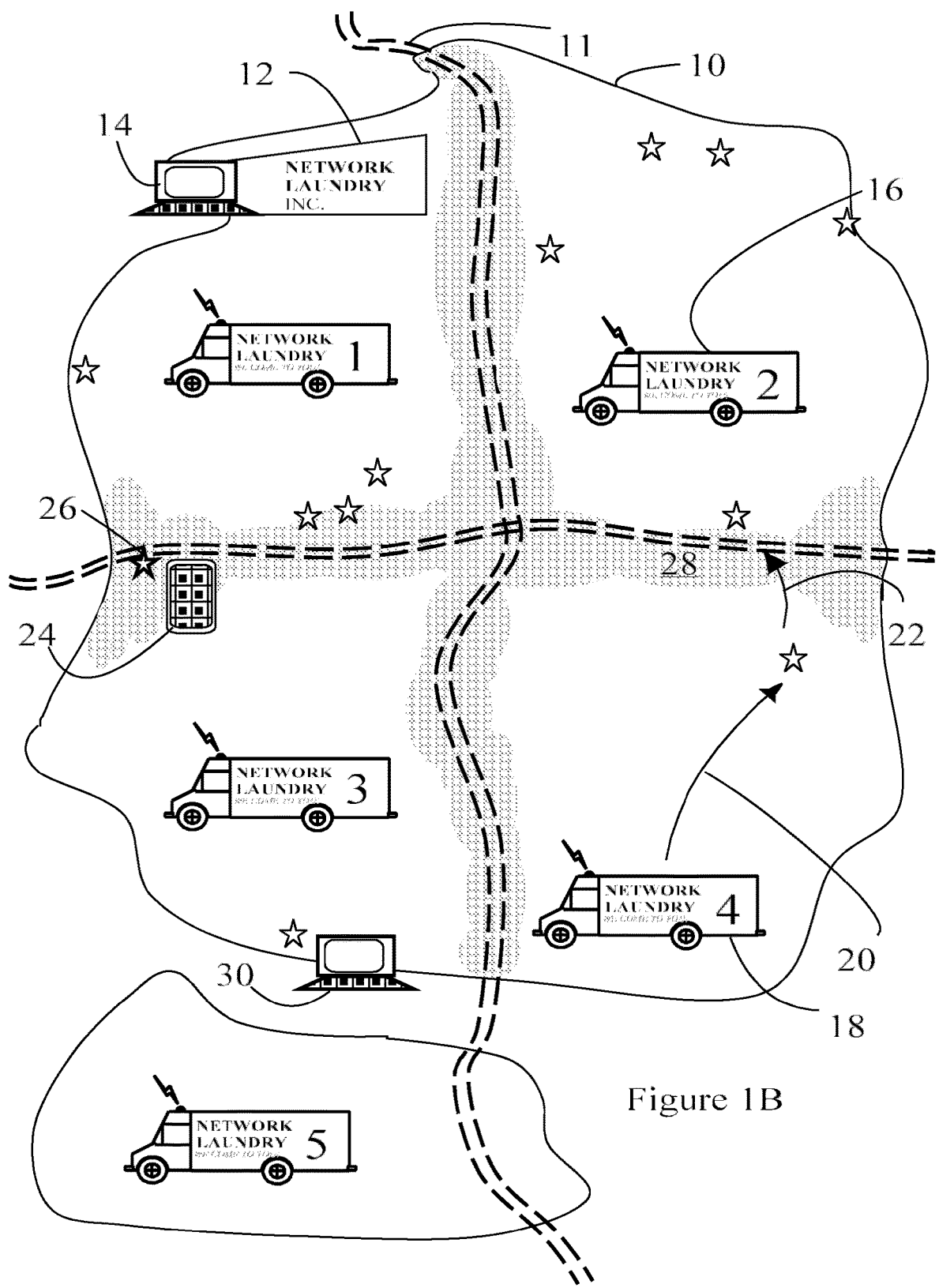
FIG. 1B is an overview of another exemplary embodiment of the mobilized laundry service system of the invention.

FIG. 1B is an overview of another exemplary embodiment of the mobilized laundry service system of the invention.

In this exemplary embodiment of the invention, the territories are virtual and mobile, as will be discussed in the next two paragraphs.

Examination of the map of the metropolitan area 10 shows that second truck 16 needs to make a number of pickups near the northern edge of the city and a single pickup to its south, near the highway. In a traditional pickup scenario, the truck would necessarily drive to all five pickups. However, in this case, it may be seen that fourth truck 18 will be sent (arrow 20) to customer location "A", then sent again (arrow 22) from "A" to "B". Clearly this is more efficient than leaving fourth truck 18 idle while truck 16 does five pickups. However, this is only possible because of the combination of the method and apparatus of the invention: trucks specially equipped for both laundry handling and delivery and pickup, combined with a location-based network system.

It may be seen that the virtual territories of the invention have boundary zone 28 between them (marked with a grid pattern). However, it will also be seen that the territories and the boundary zone 28 are constantly shifting, for example when truck 18 goes far northward following arrow 22. Thus the territories of the invention are termed "mobile" and "virtual".

This aspect of the invention is not possible for trucks which keep a fixed schedule for pickup and delivery, nor even for delivery services which do not handle laundry, nor yet for laundry service deliveries which operate only on a fixed zone basis.

Figure 2:
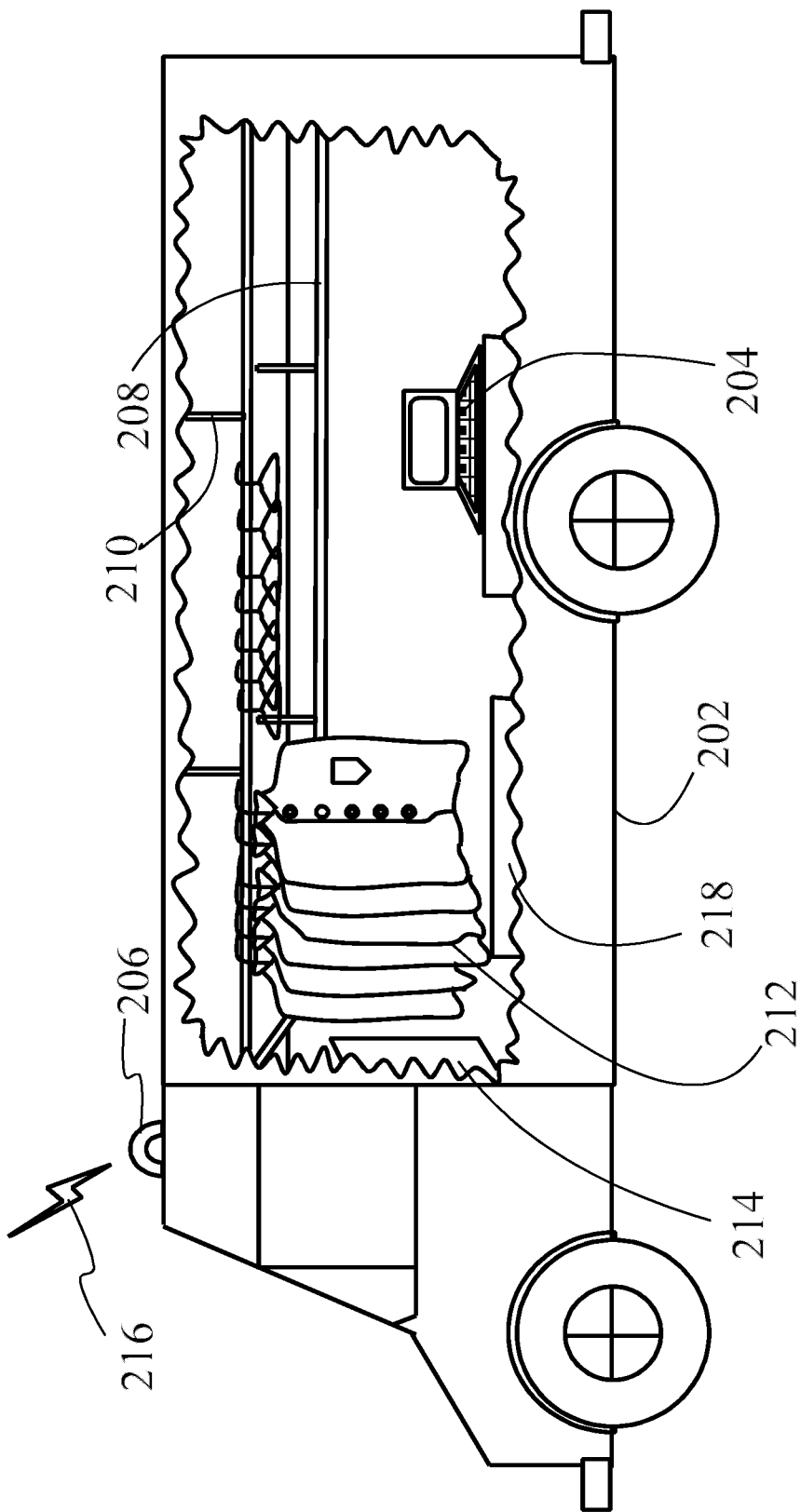
FIG. 2 is a partially cut-away perspective view of a single truck or first mobilized laundry service unit portion of the invention.

FIG. 2 is a partially cut-away perspective view of a single truck or first mobilized laundry service unit portion of the invention. The truck, a mobilized laundry service unit 202, has a central processing unit in the form of truck computer 204, however, the CPU can also be in a mobile computing or mobile communication device. While the CPU may be located as shown in the back, it may advantageously be located in the cab, allowing the driver to access it easily. It also has truck tracking device 206 and hanging conveyor 208 for hanging laundry and also for handling it: moving the laundry back and forth along the rail to whatever position is most convenient. The ceiling support 210 for the hanging conveyor 208 may be superior to traditional fixed bars running across or along the cargo area of a vehicle. Laundry 212 is thus held in a safe hanging configuration when either the vehicle is in motion or the laundry conveyor is in motion. The laundry conveyor can be used to automatically handle the laundry. For example a drive of the vehicle might reach back through doorway 214 and get the proper laundry of the rack without sorting the hanging laundry or going into the back, simply because the proper item of laundry can be moved by the conveyor to be beside door 214. Door 214 may be disposed other locations as well.

Link to other units of network 216 is a representation of a digital and wireless link to the other vehicles which make up the laundry service network, as well as to the laundry facility computer 14 (FIG. 1).

Finally laundry bin 218 may be provided for bulk laundry which does not need to be hung, or for dirty laundry and so on.

Figure 3:
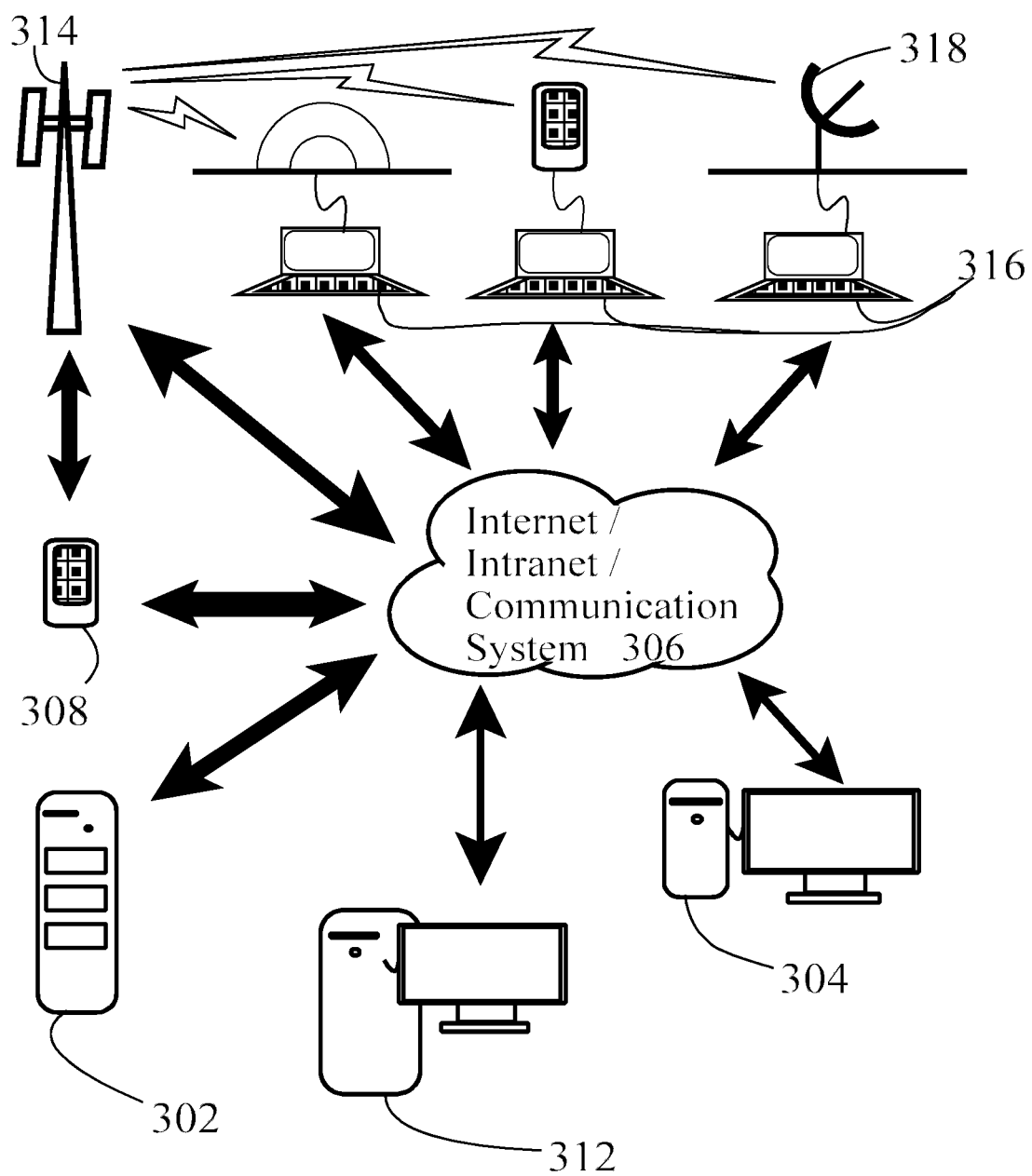
FIG. 3 is a block diagram of the electronic communication system portion of the invention.

FIG. 3 is a block diagram of the electronic communication system portion of the invention. Server 302 may provide the customer access service of the invention, by hosting a website or mobile app aspect of the invention. Office/management computer 304 is equivalent to computer 14 of FIG. 1, however, note that the "master" computer 304 may be in-truck, that is, located in one of the mobilized laundry service vehicles.

Internet or other digital network 306 is shown to indicate the most likely path of communication of the invention.

App for mobile device 308 is a module suitable for customers to have, use or access from their mobile device, as discussed in regard to FIG. 1. Website 310 is similar in this regard. Both are operative to input addresses, specific laundry instructions and other details such as payment or dates and then to provide to customers a precise time estimate (via the in-truck time estimation module) for when the mobilized laundry vehicle will arrive to make a pick-up. Customer computer 312 is shown accessing website 310.

Communication system (cell tower) 314 may be used for location sensing by communicating with the truck tracking devices 318, and may serve as a direct conduit for telephone communications as well.

Truck computer 316 will have therein the modules and functionalities of the system, combining laundry handling, delivery functions and also the precision time estimation and virtual mobile territory aspects of the invention.

Figure 4:
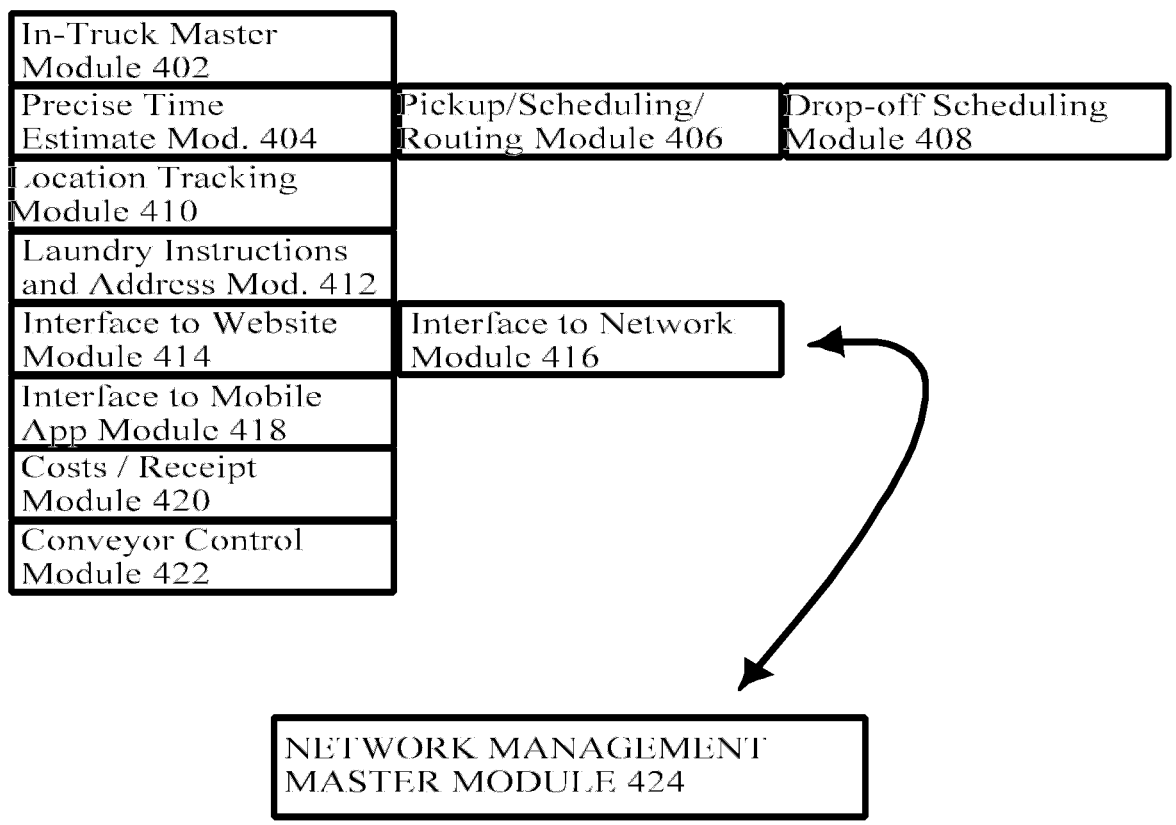
FIG. 4 is a block diagram of the modules, subroutines, aspects, or functionalities of the invention.

FIG. 4 is a block diagram of the modules, subroutines, aspects, or functionalities of the invention. In-truck master module 402 is the overall control for the other modules present in truck. Precision time estimation module 404 is important as customers requiring laundry pick-up will be very interested in the time of pick-up. Thus this module will accept the customer's address, take note of pre-existing time estimates given to other customers, and based on the location of the vehicle and the location of the pick-up and the specialized needs of laundry service, will then calculate and provide to the customer the exact time (exact being defined as a matter of a few minutes either way) of arrival of the truck at the pick-up location. Pickup scheduling & routing module 406 operates to support this by keeping track of the vehicle's schedule, promised pick-ups, drop-offs and the route necessary to carry these out, and drop-off scheduling & routing module 408 does as well. Note that scheduling of drop-offs is different than scheduling of pick-ups in that the drop-off will be scheduled far in advance (far enough in advance to allow the truck to return to the laundry facility 12 (FIG. 1), have the items laundered in accordance with specialized laundry instructions related to each item and address, and then return the items to customer. Pick-ups will be scheduled when customers call, with the goal of getting to the customer as quickly as possible.

Location tracking module 410 is necessary to allow the vehicle to know its own location. In point of fact, such modules take many forms and one may simply be a mobile device itself, rather than a specialized truck-mounted location tracker. Location tracking may be done by terrain-recognition, or inertially, or by GPS, or simply by cellular tower triangulation.

Laundry special instructions & address module associates specialized laundering instructions such as "fur" or "cold wash only" or "press" with the address of pick-up or drop-off and the item to be laundered. Thus, the module or functionality must relate/associate three items: specialized laundry instructions, address of delivery/pick-up and item.

Interface to website module 414 allows the in-truck system to communicate with a website portion of the invention, in particular to exchange customer address information and precise time estimate information, as well as other information such as specialized laundry instructions.

Interface to mobile app module 418 performs similar functionality however it interfaces with a mobile app such as mobile app 26 of FIG. 1 rather than a traditional website. Finally, interface to other network computers module 416 is operative to carry out similar functions when necessary, but more importantly it assists in tracking the locations of the vehicles of the network and thus the virtual mobile territories which the vehicles patrol.

Costs/receipt module 420 allows calculation of costs, receipt of payment, and printing of a receipt, all with information relevant to laundering: type of item, date of pick-up, scheduled date of drop-off, special laundry care instructions and so on.

Conveyor control module 422 is important as it allows the driver to operate the hanging conveyor automatically. For example, the driver might order the conveyor to traverse in a clockwise direction until the driver wishes it to stop, or the driver might order the conveyor to bring items associated with a specific address to the door of the vehicle, or the conveyor might, under control of the module, automatically and autonomously bring to the door the items necessary for the location which the vehicle is currently heading.

Master network management module 424 may reside in the computer 14 (FIG. 1) present at the laundry facility 12 (FIG. 1) or it may be an in-truck module, or it may be elsewhere. The master network management module 424 controls and coordinates operations of the various modules and various different vehicles in the network. More importantly, it provides a single user interface for a business owner or manager to centrally make changes to the system, such as price changes, changes to hours of operation of the network, and so on and so forth.

Figure 5A:
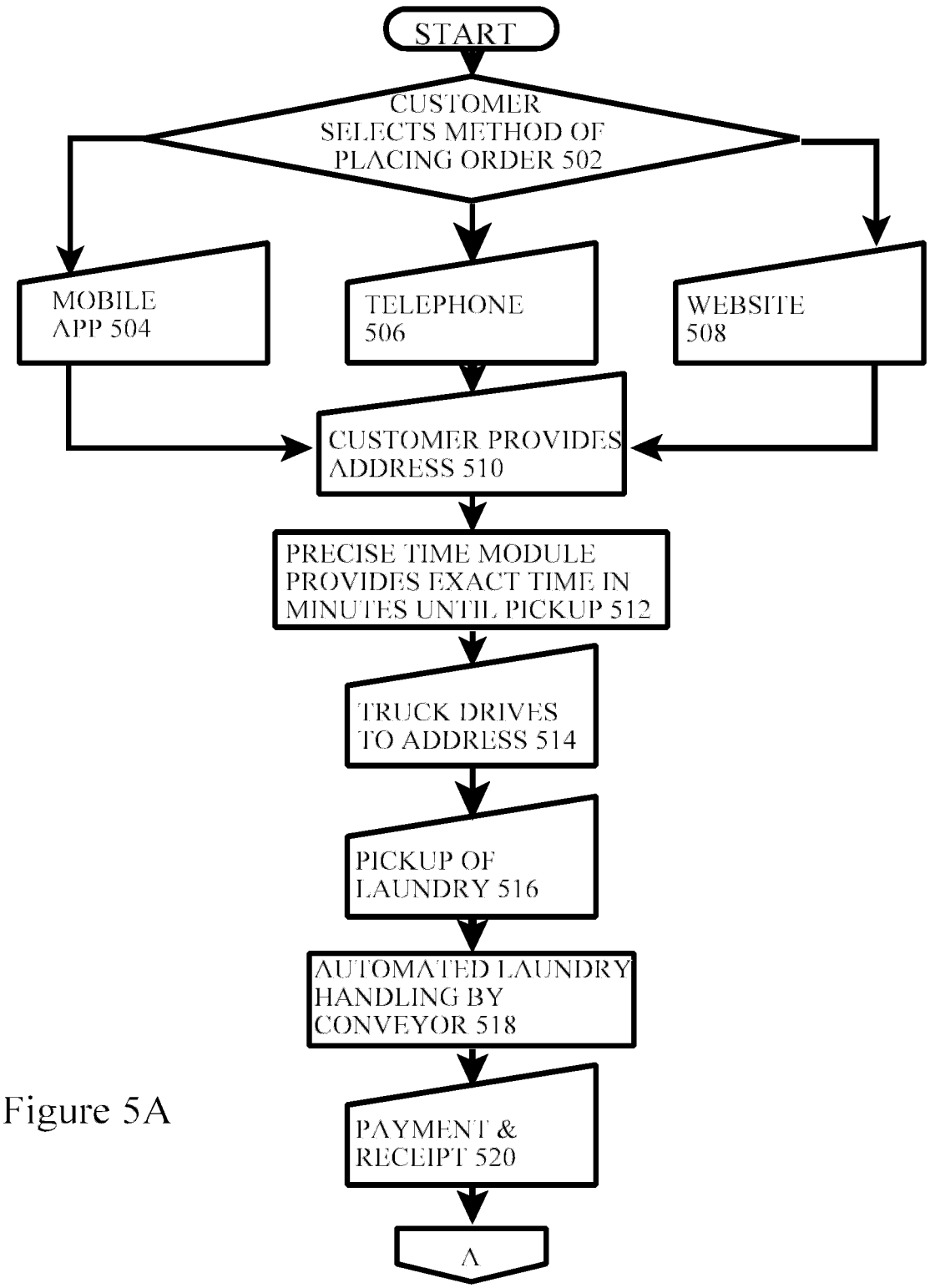
FIG. 5A and FIG. 5B show a flow-chart of the steps/procedures/operations of the invention.
Figure 5B:
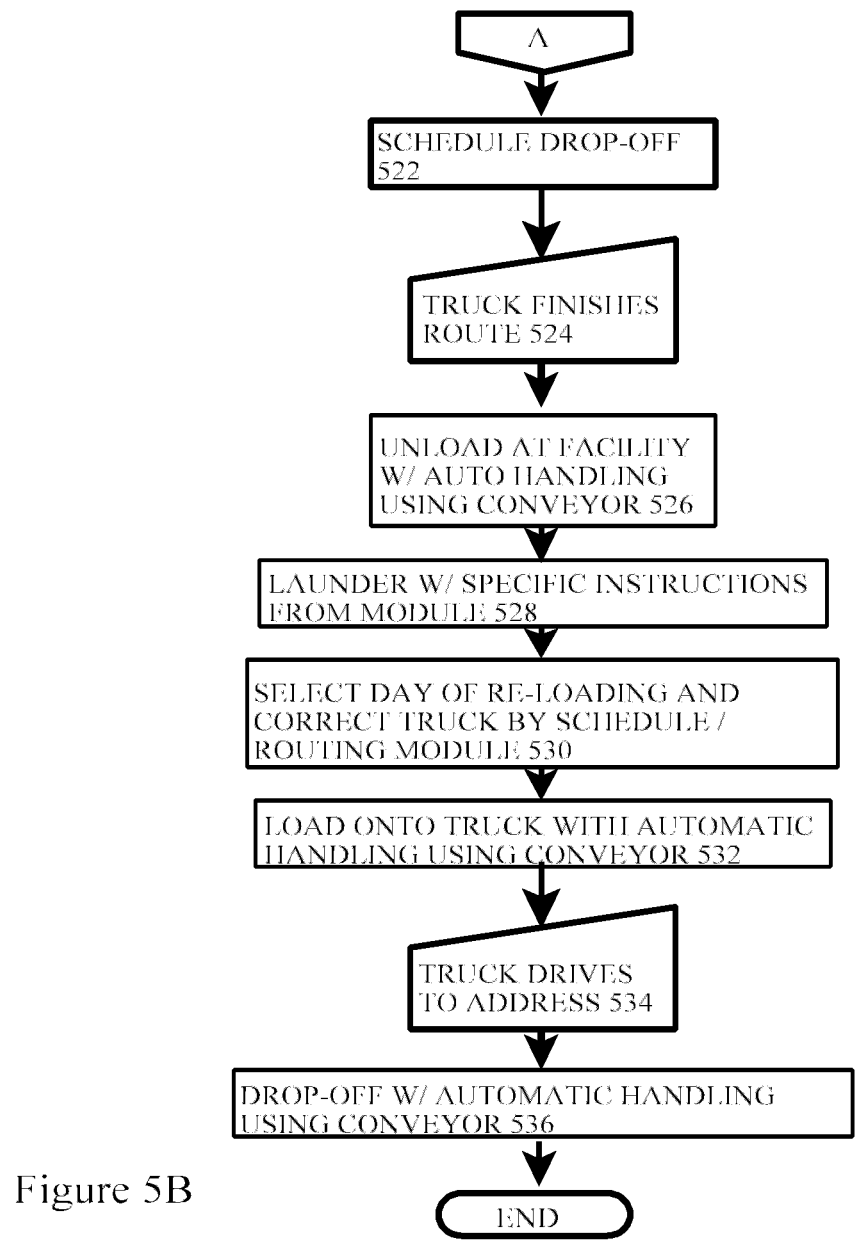

FIG. 5A and FIG. 5B show a flow-chart of the steps/procedures/operations of the invention.

In the method of the invention, the customer seeks laundry service (502). The customer may then access the system by any of a number of methods. Three examples are shown: customer accesses mobile app (504), customer calls on telephone (506), customer accesses website (508).

Regardless of the method chose, the customer provides an address (510), after which it is possible for the scheduling/routing and precision time estimation modules to provide a precise time estimate, in minutes, until the mobilized laundry service vehicle (truck, van) arrives to make pickup (512).

The vehicle then drives to the customer address as a new stop in its schedule due to the addition of the stop to route by the scheduling/routing module (514).

Pickup of laundry (516) may proceed with the physical exchange of the laundry, payment if necessary (payment may of course be done at the time of scheduling by means of the website, telephone or mobile app), and importantly, the date and location of drop-off of laundered items and the special care laundry instructions required by the customer.

Automatic stowing of the laundry can be carried using in-truck hanging conveyor (518): the driver may hang the items on the conveyor at the point closest to the doorway, then order the items moved further along the rail, or this may be done autonomously.

Payment/receipt (520) may be as discussed in relation to FIG. 4.

Drop off scheduling (522) again requires the association of laundry care instruction (which may impact the time required for laundering) with customer address (which may impact the time required for transportation, routing and so on).

Note that a vehicle will normally do more stops, as necessary, in order to complete its route and returns to laundering facility (524)

Unloading at the laundry facility using conveyor (526) is much easier than unloading without, at least for those clean items which either could not be returned or for items in need of laundering which also had to be hung on the conveyor even before laundering, such as delicates, items with definite shape to be preserved and so on.

Laundering using special instructions from the laundry special instructions & address module (528) is the actual step of cleaning, pressing and so on. The selection of the day of loading the cleaned laundry onto the vehicle and the selection of which truck to use are done by scheduling/routing module (530). Loading laundry onto the truck using conveyor (532) is another step eased by the use of a hanging conveyor in a vehicle.

The vehicle then drives to the address (534) as part of its route and drop-offs the laundry, once again with auto handling by the conveyor (536).

Figure 6A:
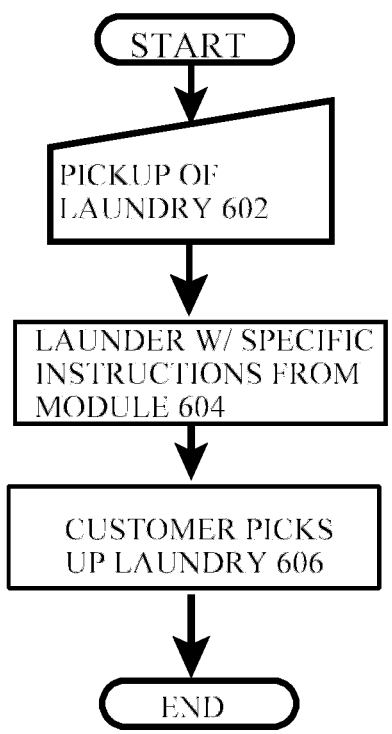
FIGS. 6A and 6B show alternative embodiments of the invention.
Figure 6B:
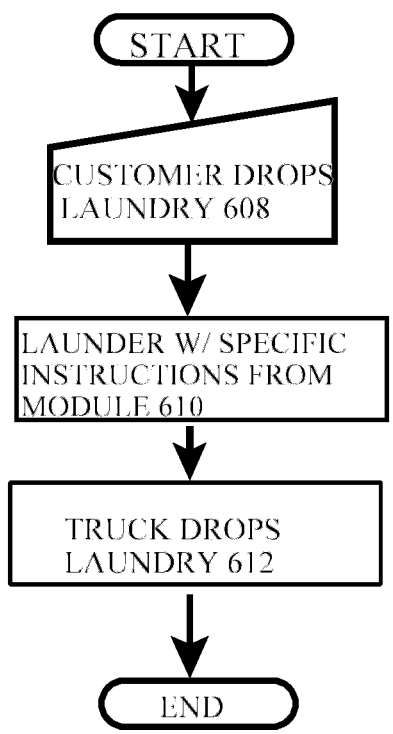

FIGS. 6A and 6B show alternative embodiments of the invention. In these embodiments the customer either chooses to drop-off or pick-up their laundry at a stationary laundry store belonging to or associate with the network. Thus in one case the pick-up and handling of laundry happens as shown in FIGS. 5A, 5B (step 602), then laundering 604 occurs also as discussed, however, the transaction terminates when the customer travels for pick-up of laundry 606, coming to a laundry store (or to laundry facility 12 of FIG. 1) to retrieve their items. In the other case, the customer travels for the drop-off of the laundry (608), but then laundering 610 and drop off and handling of laundry occur as per FIGS. 5A, 5B (step 612).

Note that the case in which a customer asks a vehicle of the mobilized service network to meet them at a location other than their home or office is nonetheless handled in accordance with FIGS. 1, 4, 5 and so on: it makes no difference if the customer wants their pick-up and drop-off to occur at home or at work, or while socializing, traveling, in the midst of doing errands or at any other location of the customer's choice.

Figure 7:
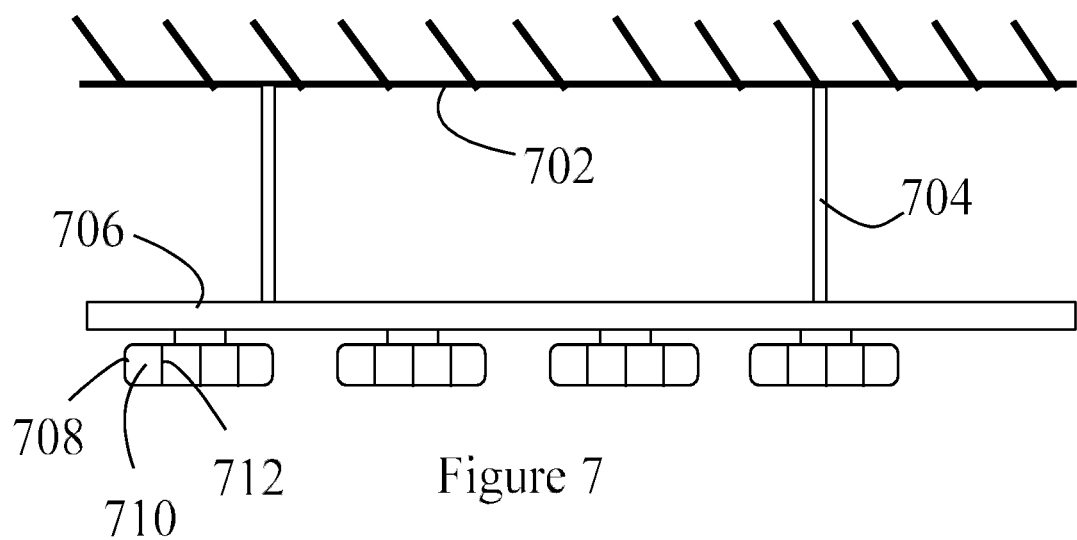
FIG. 7 shows a first embodiment of the truck-mounted conveyor of the system.

FIG. 7 shows a first embodiment of the truck-mounted hanging conveyor of the system. Ceiling 702 holds support 704 which in turn holds rail 706. Note that in practice, such systems often have the rail 706 held on the bottom by support 704, rather than the top. The top of the rail is usually the part that moves, though this is not mandatory and depends on the details of the hanger conveyor. Hanger carrier 708 (also called a hanger "truck" but NOT meaning a vehicle, just a part of the conveyor system) is an optional feature of such systems, usually each hanger carrier 708 will have a plurality of individual hanger apertures 710 separated and defined by hanger aperture blocks 712. Obviously, part of the rail and carriers move while the supports remain still stationary in most systems, though there are variations.

Figure 8:
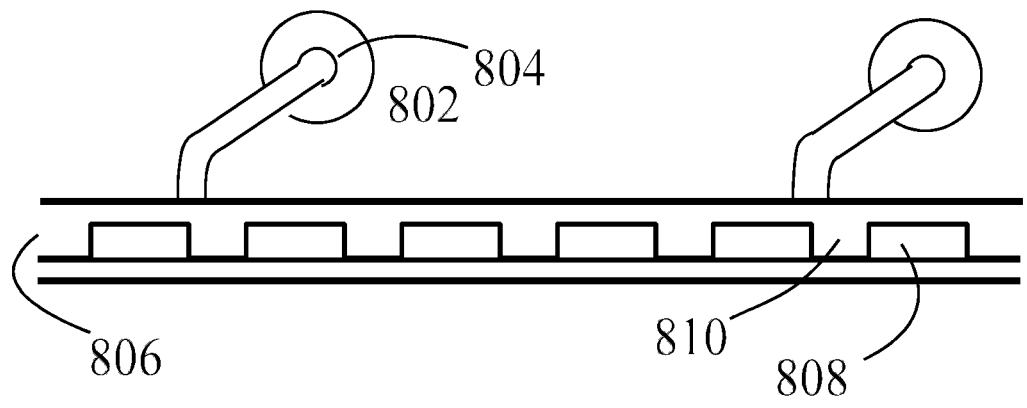
FIG. 8 shows a second embodiment of the truck-mounted conveyor of the system.

Note that the support of the system by the ceiling of the vehicle may by itself be sufficient to distinguish the system over laundry vehicles which simply have bars running from one wall of the cargo vehicle to another wall. However, FIG. 8 shows a second embodiment of the truck-mounted conveyor of the system. Wall 802 supports wall mount 804 which in turn supports rail 806.

Hanger aperture 808 and hanger aperture block 810 are much as described previously, however in this case the moving apertures are within the rail and no hanger carrier is employed.

Figure 9A:
FIGS. 9A and 9B show a first exemplary embodiment of the truck-mounted conveyor of the system.
Figure 9B:

FIGS. 9A and 9B show simply alternative embodiments of the truck-mounted conveyor of the system, in which the rail has thereon various shapes of hanger slot blocks (bumps) and hanger slots: square, saw-toothed (triangular) and so on.

Figure 10:
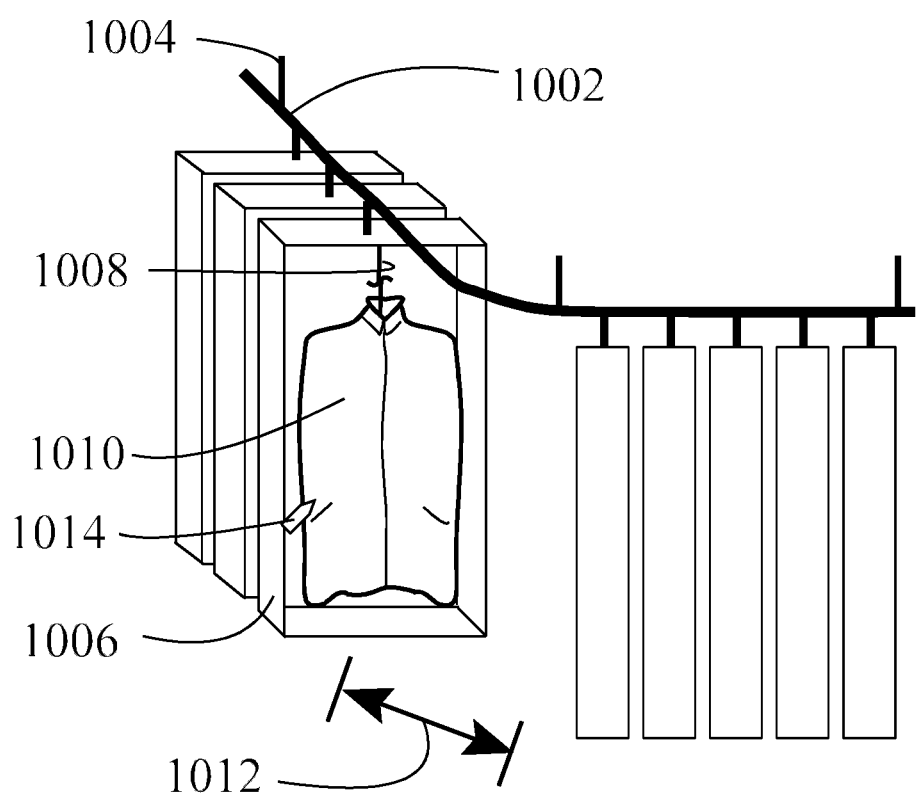
FIG. 10 shows a second exemplary embodiment of the truck-mounted conveyor of the system.

FIG. 10 shows a second exemplary embodiment of the truck-mounted conveyor of the system. Rail 1002 is held in place by support 1004, as previously discussed.

In this exemplary embodiment a hanger compartment 1006 is provided to keep laundered, dry cleaned, altered clothing in pristine condition. Within the compartment, hook 1008 may be used to provide support for garment 1010.

While the individual compartment may roll out of the line of compartments for access, it is also possible to allow a space for access, such as space 1012.

As mentioned previously, one important module of the computer system of the invention associates an address and special care instructions. Such instructions are normally printed out onto a tag, such as a sticky tag or the like, which is then physically associated with the garment (affixed, stuck to, stapled, looped around). These special laundry instruction indicators 1014 are capable of a wide variation in type but one example is shown in FIG. 10. The operative module of the system may print this out, as well as printing out receipts, tickets and so on, using a printer part of the computer of the invention.

Figure 11:
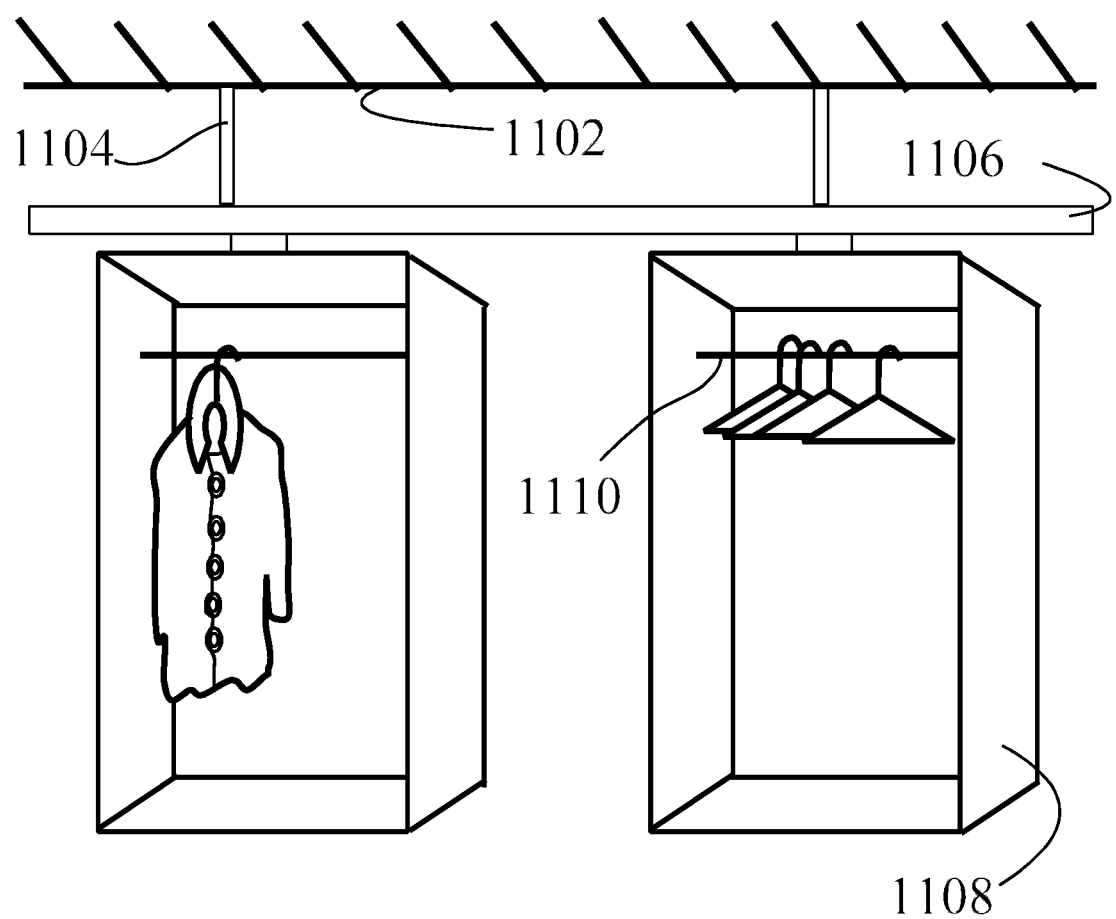
FIG. 11 shows a third exemplary embodiment of the truck-mounted conveyor of the system.

FIG. 11 shows a fourth exemplary embodiment of the truck-mounted conveyor of the system.

Ceiling 1102 has thereon support 1104 holding up rail 1106, which in turn supports a very large and luxurious hanger compartment 1108, which hangs parallel to the rail 1106 rather than perpendicular to it as in the previous embodiment. Within hanger compartment 1108 is hanger bar 1110, onto which laundry may be placed. This example of a hanging conveyor provides a high degree of protection for laundered and pressed clothing against the travails of transportation. Obviously the shape of the compartment 1108 is exemplary only.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. An electronic laundry vehicle network for carrying out normal laundry operations such as dry-cleaning, laundry, housekeeping, alteration, leather, the electronic laundry vehicle network comprising:
   a plurality of laundry vehicles;
   each of said laundry vehicles having a location tracking device, a central processing device and a non-volatile digital memory device;
   a cargo compartment having a hanging conveyor;
   at least one hanger carrier upon such rail,
   a hanging laundry compartment hanging from the hanger carrier, the hanging laundry compartment different from the cargo compartment and hanging within the cargo compartment;
   the hanging compartment having therewithin a bar dimensioned and configured to hold laundry hangers, the hanging compartment dimensioned and configured to accept such laundry therewithin; whereby such laundry hangs protected within the compartment
   each of said non-volatile digital memory devices having a plurality of modules for use by said central processing devices;
      a customer access service operative to receive a specific first customer location, said modules including;
   an in-vehicle network interface module operative to maintain data exchange between each of said laundry vehicles and said network;
   an in-vehicle address and laundry instruction module operative to receive said specific first customer location;
   an in-vehicle precise time estimate module operative to immediately provide a precise time for one of said laundry vehicles to reach said specific first customer location;
   an in-vehicle pickup/scheduling/routing module operative to efficiently route one of said laundry vehicles among a plurality of customer locations;
      an in-vehicle master laundry module operative to control functionality of said modules;
   said in-vehicle address and laundry instructions module further operative to receive specific laundry instructions and associate them with said specific first customer location;
   said pickup/scheduling/routing module further operative to monitor locations of each of said laundry vehicles and efficiently route one of said laundry vehicles to said specific first customer location.

2. The electronic laundry vehicle network of claim 1, further comprising:
   a conveyor control module operant to automatically control said hanging conveyor.

3. The electronic laundry vehicle network of claim 1, wherein:
   said customer access service further comprises a mobile app and an in-vehicle interface to mobile app module operant to receive said specific first customer location.

4. The electronic laundry vehicle network of claim 1, wherein said non-volatile digital memory device further comprises:
   a cost/receipt module operative to communicate with a printing device and print out special instructions indicators suitable for garment attachment.

5. A mobilized laundry service vehicle comprising:
   a cargo vehicle;
   said cargo vehicle equipped with a hanging conveyor having a movable rail, said rail having at least one individual hanger aperture dimensioned and configured to receive at least one laundry hanger; at least one hanger carrier upon such rail,
   a hanging compartment depending from the hanger carrier,
   the hanging compartment having therewithin a bar dimensioned and configured to hold laundry hangers, the hanging compartment dimensioned and configured to accept such laundry therewithin; whereby such laundry hangs protected within the compartment
   said cargo vehicle further having a location tracking device, a central processing device and a non-volatile digital memory device;
   said cargo vehicle further having a conveyor control module operant to automatically control said hanging conveyor;
   said cargo vehicle further having an in-vehicle network interface module operative to maintain data exchange between said laundry vehicles and a computer network;
   said cargo vehicle further having an in-vehicle address and laundry instruction module operative to receive a specific first customer location;
   said cargo vehicle further having a precise time estimate module operative to immediately provide a precise time for said laundry vehicle to reach said specific first customer location;
   said cargo vehicle further having a pickup/scheduling/routing module operative to efficiently route said laundry vehicle among a plurality of customer locations and further operative to monitor locations of each of said laundry vehicles and efficiently route one of said laundry vehicles to said specific first customer location;
   said cargo vehicle further having an in-vehicle master laundry module operative to control functionality of said modules;
   said in-vehicle address and laundry instructions module further operative to receive specific laundry instructions and associate them with said specific first customer location.

6. The mobilized laundry service vehicle of claim 5, further comprising:
   said hanger carrier having said individual hanger aperture thereon.

7. The mobilized laundry service vehicle of claim 6, wherein the hanger aperture comprises:
   a hanger slot defined by two hanger blocks.

8. The mobilized laundry service vehicle of claim 5, wherein:
   said hanging conveyor depends from the ceiling of said cargo vehicle.

9. The mobilized laundry service vehicle of claim 5, wherein said non-volatile digital memory device further comprises:
   a cost/receipt module operative to communicate with a printing device and print out special instructions indicators suitable for garment attachment.

* * * * *